United States Patent Office 3,304,161
Patented Feb. 14, 1967

3,304,161
SPONTANEOUSLY COMBUSTIBLE CHARCOAL
BRIQUETTE
Miles J. McGoff, Warrendale, Pa., assignor to Mine Safety Appliances Company, Pittsburgh, Pa., a corporation of Pennsylvania
No Drawing. Filed Dec. 28, 1964, Ser. No. 421,646
2 Claims. (Cl. 44—17)

This invention relates to charcoal briquettes.

It is an object of this invention to provide a charcoal briquette that spontaneously ignites in air.

In accordance with this invention, a briquette is formed principally of a charred intimate mixture of charcoal, sugar, potassium permanganate and briquetting starch in such proportions that it will spontaneously ignite on exposure to ambient air, suitably from about 63 to 67% finely divided charcoal, 11 to 12% sugar, 16 to 18% potassium permanganate, and 6 to 7% briquetting starch, by weight. The physical form of the briquette may be round, rectangular, or other shape, but it should have a surface to volume ratio of at least about 7 square inches to each cubic inch to insure reliable self-ignition.

A preferred rectangular briquette configuration having a surface to volume ratio of about 7.1 to 1 is 10¼ inches long, 10¼ inches wide and 1⅛ inches thick, having 144 evenly spaced ⅝-inch diameter holes through the thickness thereof.

Illustrative of this invention, 115 g. of sugar and 60 g. starch are hydrolyzed in 625 cc. of water and thoroughly mixed with 635 g. of 300 mesh airfloat hardwood charcoal. 1000 g. of 17% potassium permanganate solution in water is added to the foregoing mixture with mixing to give an intimate mixture of all the components. The permanganate solution is added slowly, and additional water, up to about 500 cc., can be added if necessary to limit temperature excursions from the heat of reaction. The mixture is then pressed into a cake of the desired shape and dried at a low temperature to remove water, suitably 170° F. for 24 hours. The dried cake is then tightly double wrapped in metal foil, such as aluminum foil, and charred under an inert atmosphere in a hot oven, suitably for 4 hours at 800° F. After cooling to substantially room temperature, the wrapped briquette is removed from the oven. The tightly wrapped aluminum foil is substantially a hermetic seal, but if desired the seams of the wrapping may be further sealed with adhesive or the entire package may be dipped and coated with paraffin wax or the like, to prevent accidental loosening of the wrappings.

When the wrapping is removed and the briquette is exposed to air, the briquette will spontaneously ignite after a delay of several minutes, for example, about 4 to 5 minutes at normal room temperature, the delay time depending somewhat on the ambient temperature and the configuration of the briquettes.

It is apparent that the briquette of this invention may be used either as a primary fuel or as a starter for ordinary charcoal briquettes or other fuels.

According to the patent statutes, I have explained the principle and mode of practicing my invention and have described what I now consider to be its best embodiment. However, I desire to have it understood that, within the scope of the appended claims, the invention may be practiced otherwise than as specifically described.

I claim:

1. A spontaneously combustible briquette consisting essentially of a compact of an intimate mixture of about 63 to 67% charcoal, 11 to 12% sugar, 6 to 7% starch and 16 to 18% potassium permanganate and having a surface to volume ratio of at least about 7 square inches to each cubic inch, charred under an inert atmosphere.

2. A spontaneously combustible briquette consisting essentially of a compact of an intimate mixture of about 63 to 67% charcoal, 11 to 12% sugar, 6 to 7% starch and 16 to 18% potassium permanganate and having a sufficient number of evenly spaced holes therethrough to provide a surface to volume ratio of at least about 7 square inches to each cubic inch, charred under an inert atmosphere.

References Cited by the Examiner
UNITED STATES PATENTS

| | | | |
|---|---|---|---|
| 647,622 | 4/1900 | Vallet-Rogez | 44—17 |
| 708,774 | 1/1902 | Livingstone et al. | 44—17 |
| 850,232 | 4/1907 | Kline | 44—17 |
| 964,523 | 7/1910 | Jowett | 44—17 |
| 1,959,472 | 5/1934 | Heffernan et al. | 44—38 X |

FOREIGN PATENTS

| | | |
|---|---|---|
| 427,902 | 6/1911 | France. |
| 674,504 | 10/1929 | France. |
| 494,770 | 11/1938 | Great Britain. |

DANIEL E. WYMAN, Primary Examiner.

C. F. DEES, Assistant Examiner.